(12) United States Patent
Dillon

(10) Patent No.: US 6,422,321 B1
(45) Date of Patent: Jul. 23, 2002

(54) AERATOR ATTACHMENT FOR A GROUND TILLER

(76) Inventor: Dennis Dillon, 47 Drexel St., Worcester, MA (US) 01602

( * ) Notice: Subject to any disclaimer, the term of this patent is extended or adjusted under 35 U.S.C. 154(b) by 0 days.

(21) Appl. No.: 09/737,786

(22) Filed: Dec. 15, 2000

(51) Int. Cl.⁷ .............................................. A01B 45/02
(52) U.S. Cl. ....................................................... 172/21
(58) Field of Search .......................... 172/21, 22, 518, 172/540, 554, 122, 42, 118, 123

(56) References Cited

U.S. PATENT DOCUMENTS

| | | | | |
|---|---|---|---|---|
| 3,596,450 A | * | 8/1971 | Bowers | 172/21 X |
| 3,650,331 A | * | 3/1972 | Dedoes | 172/21 |
| 3,756,203 A | * | 9/1973 | Dedoes | 172/464 |
| 3,794,121 A | | 2/1974 | Drozak | |
| 4,192,387 A | * | 3/1980 | Stinson | 172/21 |
| D281,693 S | | 12/1985 | Doering | |
| 5,353,724 A | | 10/1994 | Wheely, Jr. | |
| 5,460,229 A | | 10/1995 | Mattis | |
| 5,488,917 A | * | 2/1996 | Santoli et al. | 111/91 |
| 5,586,604 A | | 12/1996 | Postema | |
| 5,623,996 A | | 4/1997 | Postema | |
| 5,690,179 A | * | 11/1997 | Dickson | 172/21 |
| 5,906,090 A | * | 5/1999 | Knudsen | 172/21 X |

* cited by examiner

Primary Examiner—Christopher J. Novosad

(57) ABSTRACT

An aerator attachment for a ground tiller for providing another useful function for a ground tiller. The aerator attachment for a ground tiller includes a pair of tubular axles each of which includes a first end and a second end and each of which is adapted to mount to a respective shaft of a ground tiller; and also includes a plurality of wheel assemblies being mounted to the tubular axles; and further includes a plurality of spikes being securely attached to the wheel assemblies and being adapted to puncture holes in a ground.

6 Claims, 4 Drawing Sheets

AERATOR ATTACHMENT FOR A GROUND TILLER

BACKGROUND OF THE INVENTION

1. Field of the Invention

The present invention relates to an aerating attachment and more particularly pertains to a new aerator attachment for a ground tiller for providing another useful function for a ground tiller.

2. Description of the Prior Art

The use of an aerating attachment is known in the prior art. More specifically, an aerating attachment heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,586,604; 5,460,229; 5,623,996; 5,353,724; 3,794,121; and U.S. Pat. No. Des. 281,693.

While these devices fulfill their respective, particular objectives and requirements, the aforementioned patents do not disclose a new aerator attachment for a ground tiller. The inventive device includes a pair of tubular axles each of which includes a first end and a second end and each of which is adapted to mount to a respective shaft of a ground tiller; and also includes a plurality of wheel assemblies being mounted to the tubular axles; and further includes a plurality of spikes being securely attached to the wheel assemblies and being adapted to puncture holes in a ground.

In these respects, the aerator attachment for a ground tiller according to the present invention substantially departs from the conventional concepts and designs of the prior art, and in so doing provides an apparatus primarily developed for the purpose of providing another useful function for a ground tiller.

SUMMARY OF THE INVENTION

In view of the foregoing disadvantages inherent in the known types of aerating attachment now present in the prior art, the present invention provides a new aerator attachment for a ground tiller construction wherein the same can be utilized for providing another useful function for a ground tiller.

The general purpose of the present invention, which will be described subsequently in greater detail, is to provide a new aerator attachment for a ground tiller which has many of the advantages of the aerating attachment mentioned heretofore and many novel features that result in a new aerator attachment for a ground tiller which is not anticipated, rendered obvious, suggested, or even implied by any of the prior art aerating attachment, either alone or in any combination thereof.

To attain this, the present invention generally comprises a pair of tubular axles each of which includes a first end and a second end and each of which is adapted to mount to a respective shaft of aground tiller; and also includes a plurality of wheel assemblies being mounted to the tubular axles; and further includes a plurality of spikes being securely attached to the wheel assemblies and being adapted to puncture holes in a ground.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new aerator attachment for a ground tiller which has many of the advantages of the aerating attachment mentioned heretofore and many novel features that result in a new aerator attachment for a ground tiller which is not anticipated, rendered obvious, suggested, or even implied by any of the prior art aerating attachment, either alone or in any combination thereof.

It is another object of the present invention to provide a new aerator attachment for a ground tiller which may be easily and efficiently manufactured and marketed.

It is a further object of the present invention to provide a new aerator attachment for a ground tiller which is of a durable and reliable construction.

An even further object of the present invention is to provide a new aerator attachment for a ground tiller which is susceptible of a low cost of manufacture with regard to both materials and labor, and which accordingly is then susceptible of low prices of sale to the consuming public, thereby making such aerator attachment for a ground tiller economically available to the buying public.

Still yet another object of the present invention is to provide a new aerator attachment for a ground tiller which provides in the apparatuses and methods of the prior art some of the advantages thereof, while simultaneously overcoming some of the disadvantages normally associated therewith.

Still another object of the present invention is to provide a new aerator attachment for a ground tiller for providing another useful function for a ground tiller.

Yet another object of the present invention is to provide a new aerator attachment for a ground tiller which includes a pair of tubular axles each of which includes a first end and a second end and each of which is adapted to mount to a respective shaft of a ground tiller; and also includes a plurality of wheel assemblies being mounted to the tubular axles; and further includes a plurality of spikes being securely attached to the wheel assemblies and being adapted to puncture holes in a ground.

Still yet another object of the present invention is to provide a new aerator attachment for a ground tiller that can be easily and conveniently mounted to the shafts of a ground tiller.

Even still another object of the present invention is to provide a new aerator attachment for a ground tiller that saves the user substantial money by being able to use a ground tiller for aerating purposes without having to obtain separate equipment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
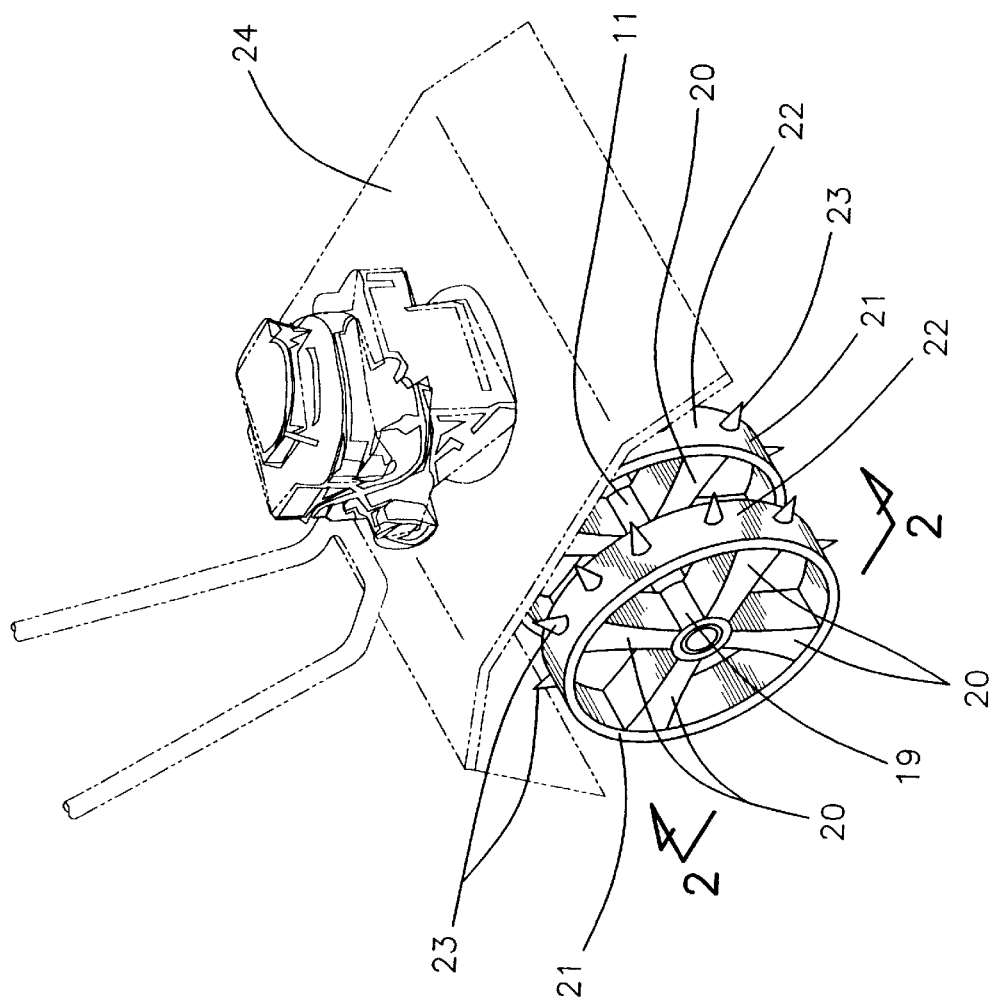
FIG. 1 is a perspective view of a new aerator attachment for a ground tiller according to the present invention.
Figure 2:
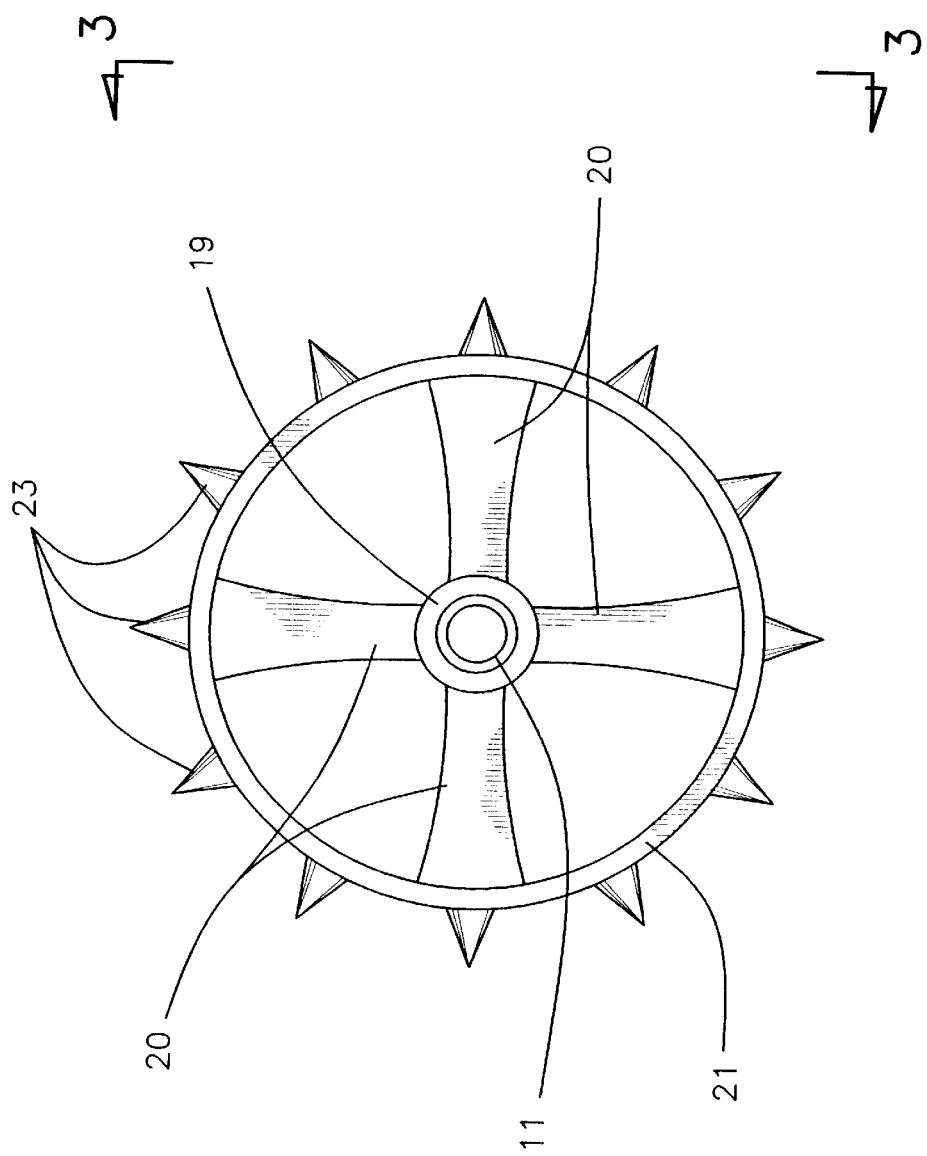
FIG. 2 is an end elevational view of the present invention.
Figure 3:
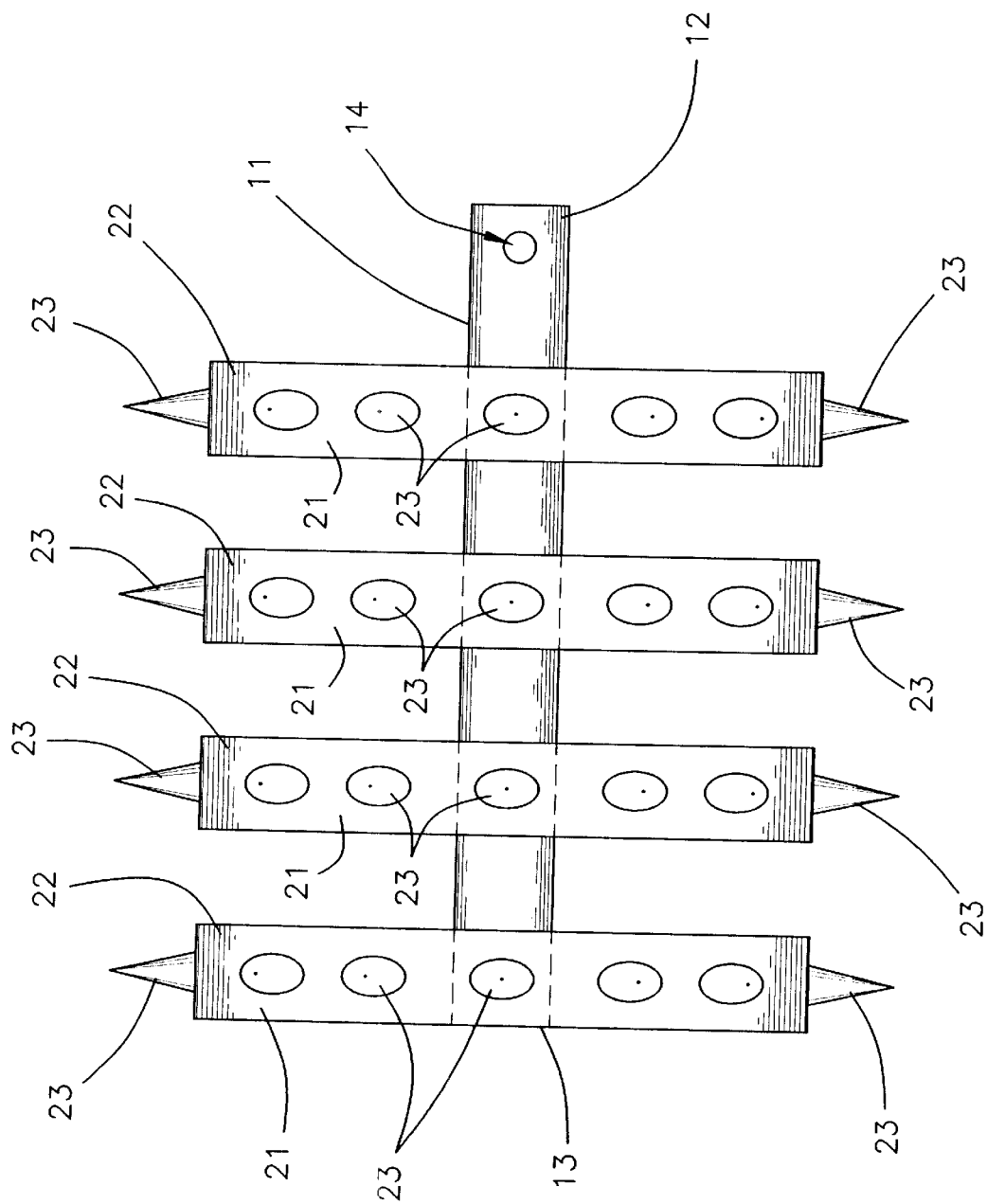
FIG. 3 is a partial side elevational view of the present invention.
Figure 4:
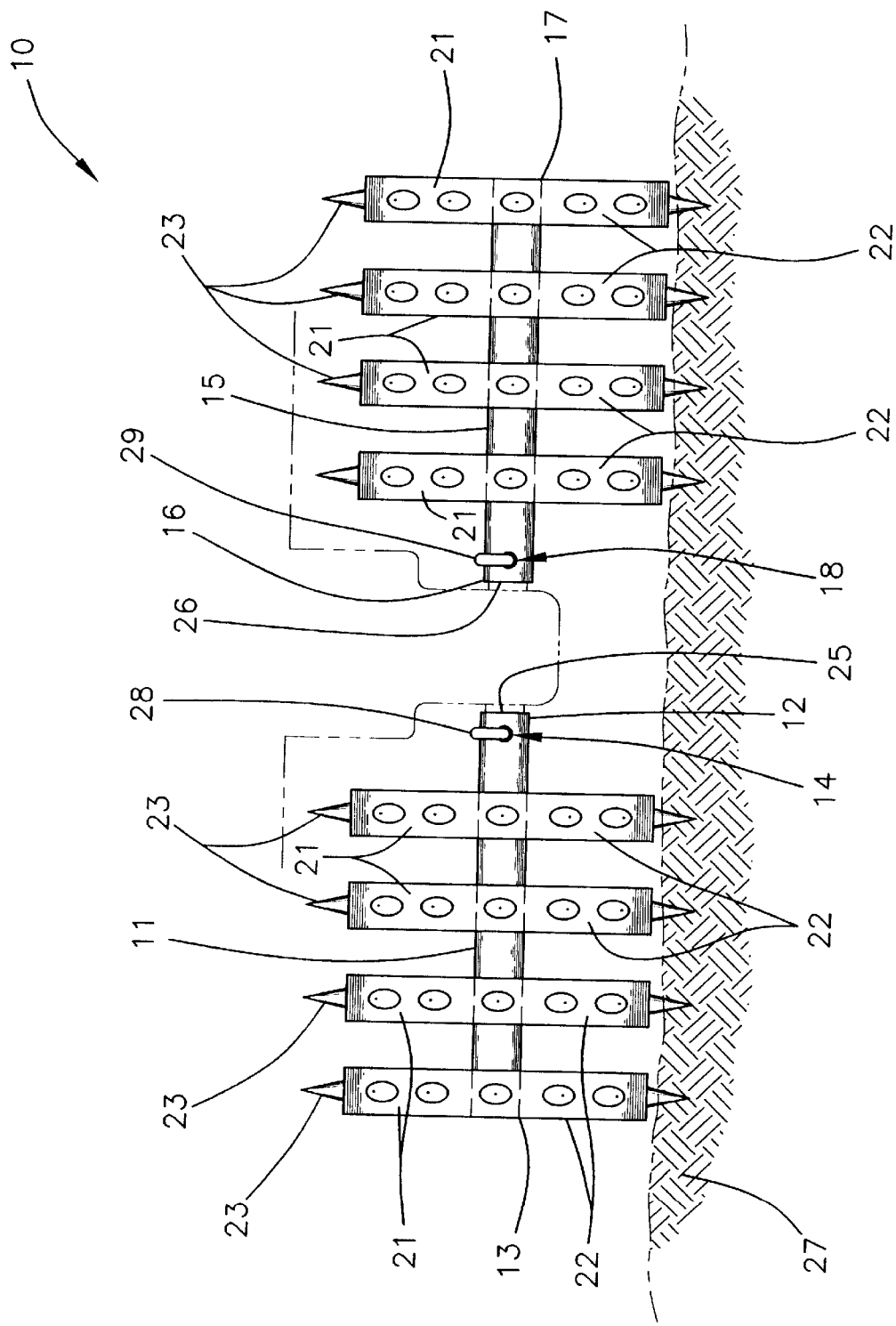
FIG. 4 is a side elevational view of the present invention being mounted to a ground tiller.

With reference now to the drawings, and in particular to FIGS. 1 through 4 thereof, a new aerator attachment for a ground tiller embodying the principles and concepts of the present invention and generally designated by the reference numeral 10 will be described.

As best illustrated in FIGS. 1 through 4, the aerator attachment for a ground tiller 10 generally comprises a pair of tubular axles 11, 15 each of which includes a first end 12, 16 and a second end 13, 17 and each of which is adapted to conventionally mount to a respective shaft 25, 26 of a ground tiller 24. Each of the tubular axles 11, 15 also includes diametrically-opposed holes 14, 18 being disposed through a wall near the first end 12, 16 thereof. The holes 14, 18 are adapted to receive fasteners 28, 29 for fastening the axles 11, 15 to the shafts 25, 26 of the ground tiller 24. Each of the tubular axles 11, 15 has a length of approximately 10 inches.

A plurality of wheel assemblies are conventionally mounted to the tubular axles 11, 15. Each of the wheel assemblies includes a tubular hub member 19 which is securely and conventionally mounted about a respective one of the tubular axles 11, 15, and also includes a plurality of spokes 20 being securely and conventionally attached to the tubular hub member 19 and extending radially therefrom, and further includes a circular rim member 21 being securely and conventionally attached to the spokes 20 and having a wall 22. The wheel assemblies are spaced upon the tubular axles 11, 15 and also include outer wheel assemblies which are mounted at the second ends 13, 17 of the tubular axles 11, 15. Each of the wheel assemblies has a diameter of approximately 8 inches with each wall 22 of the circular rim members 21 having a width of approximately 1 inch.

A plurality of spikes 23 are securely and conventionally attached to the wheel assemblies and are adapted to puncture holes in a ground 27. The spikes 23 are securely and conventionally attached to exteriors of the walls 22 of the circular rim members 21 of the wheel assemblies and are circumferentially-spaced along the circular rim members 21. Each of the spikes 23 is conical shaped and has a pointed end which is adapted to penetrate in the ground 27. Each of the spikes 23 has a length of approximately 2 inches.

In use, the user mounts the aerator attachment 10 to the shafts 25, 26 of the ground tiller 24 and moves the ground tiller 24 upon the ground 27 to puncture holes in the ground 27 with the spikes 23 for aerating purposes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aerator attachment for a ground tiller comprising:
    a pair of tubular axles each of which includes a first end and a second end and each of which is adapted to mount to a respective shaft of a ground tiller;
    a plurality of wheel assemblies being mounted to said tubular axles;
    a plurality of spikes being securely attached to said wheel assemblies and being adapted to puncture holes in a ground; wherein each of said tubular axles also includes diametrically-opposed holes being disposed through a wall near said first end thereof, said holes being adapted to receive fasteners for fastening said tubular axles to the shafts of the ground tiller.

2. An aerator attachment for a ground tiller as described in claim 1, wherein each of said wheel assemblies includes a tubular hub member which is securely mounted about a respective one of said tubular axles, and also includes a plurality of spokes being securely attached to said tubular hub member and extending radially therefrom, and further includes a circular rim member being securely attached to said spokes and having a wall.

3. An aerator attachment for a ground tiller as described in claim 2, wherein said wheel assemblies are spaced upon said tubular axles and also include outer wheel assemblies which are mounted at said second ends of said tubular axles.

4. An aerator attachment for a ground tiller as described in claim 3, wherein said spikes are securely attached to exteriors of said walls of said circular rim members of said wheel assemblies and are circumferentially-spaced along said circular rim members.

5. An aerator attachment for a ground tiller as described in claim 4, wherein each of said spikes is conical shaped and has a pointed end which is adapted to penetrate in the ground.

6. An aerator attachment for a ground tiller comprising:

a pair of tubular axles each of which includes a first end and a second end and each of which is adapted to mount to a respective shaft of a ground tiller, each of said tubular axles also including diametrically-opposed holes being disposed through a wall near said first end thereof, said holes being adapted to receive fasteners for fastening said tubular axles to the shafts of the ground tiller, each of said tubular axles having a length of approximately 10 inches;

a plurality of wheel assemblies being mounted to said tubular axles, each of said wheel assemblies including a tubular hub member which is securely mounted about a respective one of said tubular axles, and also including a plurality of spokes being securely attached to said tubular hub member and extending radially therefrom, and further including a circular rim member being securely attached to said spokes and having a wall, said wheel assemblies being spaced upon said tubular axles and also including outer wheel assemblies which are mounted at said second ends of said tubular axles, each of said wheel assembly having a diameter of approximately 8 inches, each said wall of said circular rim members having a width of approximately 1 inch; and a plurality of spikes being securely attached to said wheel assemblies and being adapted to puncture holes in a ground, said spikes being securely attached to exteriors of said walls of said circular rim members of said wheel assemblies and being circumferentially-spaced along said circular rim members, each of said spikes being conical shaped and having a pointed end which is adapted to penetrate in the ground, each of said spikes having a length of approximately 2 inches.

\* \* \* \* \*